Figure 1:
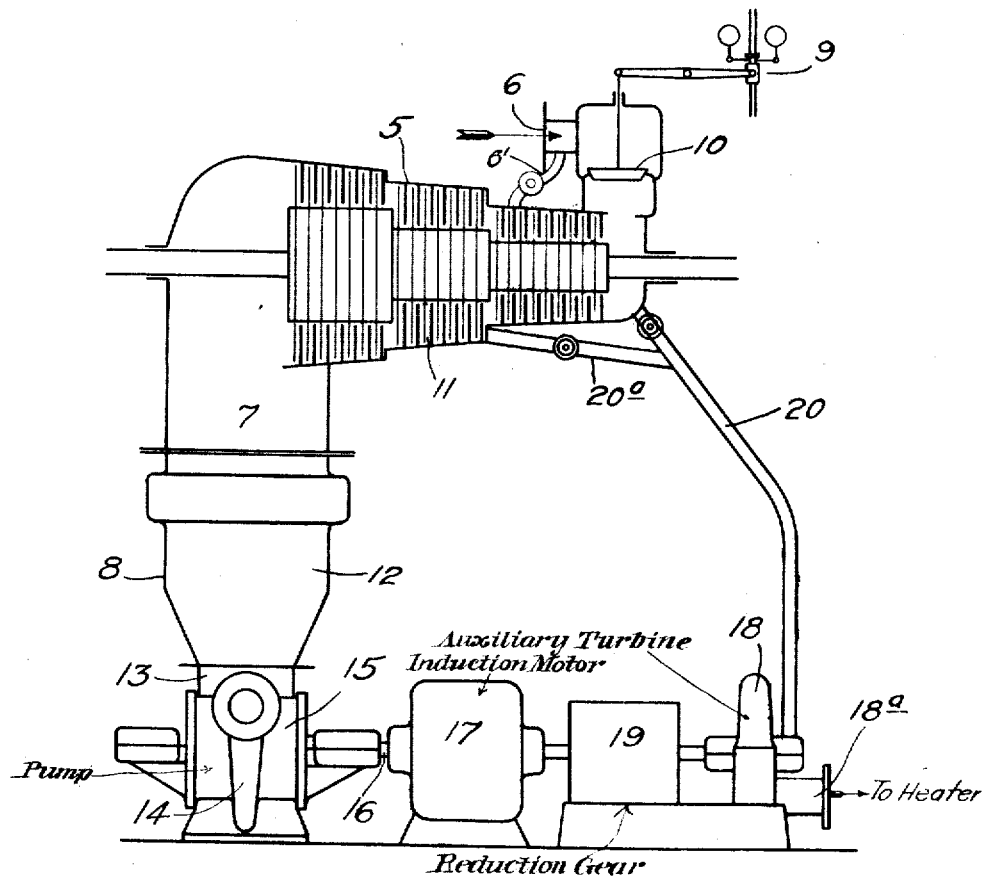

R. N. EHRHART.
HEAT CONSERVING APPARATUS.
APPLICATION FILED NOV. 21, 1917.

1,343,666.

Patented June 15, 1920.
2 SHEETS—SHEET 2.

INVENTOR.
Raymond N. Ehrhart.
BY
HIS ATTORNEY IN FACT

UNITED STATES PATENT OFFICE.

RAYMOND N. EHRHART, OF EDGEWOOD PARK, PENNSYLVANIA, ASSIGNOR TO WESTINGHOUSE ELECTRIC & MANUFACTURING CO., A CORPORATION OF PENNSYLVANIA.

HEAT-CONSERVING APPARATUS.

1,343,666.   Specification of Letters Patent.   Patented June 15, 1920.

Application filed November 21, 1917. Serial No. 203,261.

*To all whom it may concern:*

Be it known that I, RAYMOND N. EHRHART, a citizen of the United States, and a resident of Edgewood Park, in the county of Allegheny and State of Pennsylvania, have made a new and useful Invention in Heat-Conserving Apparatus, of which the following is a specification.

This invention relates to the conservation of heat in power developing systems and has for an object to produce a new and improved apparatus for preventing or reducing the loss of heat from such a system.

In power plants the feed water for the boilers or steam generators is often heated by exhaust steam from the auxiliaries; that is, by steam exhausted from the turbines or engines which drive the circulating pumps, air pumps, feed water pumps and the like. The load on the auxiliaries is substantially constant irrespective of the load on the main power developing units, consequently under some operating conditions the amount of exhaust steam available for feed heating purposes may be considerably in excess of that required. For example, when the main units are operating under light loads the amount of feed water to be heated is small, but the steam delivered by the auxiliaries is approximately the same as under full load conditions and consequently is in excess of the amount required to heat the feed water to the desired temperature. As a result the excess steam is discharged to the atmosphere with the attendant heat loss to the system. It is evident that it is desirable to proportion the amount of available exhaust steam for heating feed water to the amount of feed water to be heated, so that all of the available heat in the exhaust steam will be economically utilized.

A more specific object of my invention is to produce an apparatus for maintaining a balance between the amount of exhaust steam available for feed water heating and the amount of feed water to be heated.

A further object is to produce a power developing apparatus in which the load on the steam driven auxiliaries is varied in accordance with the amount of exhaust steam required for feed water heating purposes.

A further object is to produce new and improved apparatus for controlling the delivery of steam to the feed water heater.

These and other objects are attained by means of apparatus embodying the features herein described and illustrated in the drawings accompanying and forming a part hereof.

In the drawings: Figure 1 is a diagrammatic view of a power developing system embodying my invention, a portion of the apparatus being shown in section.

Figure 2:
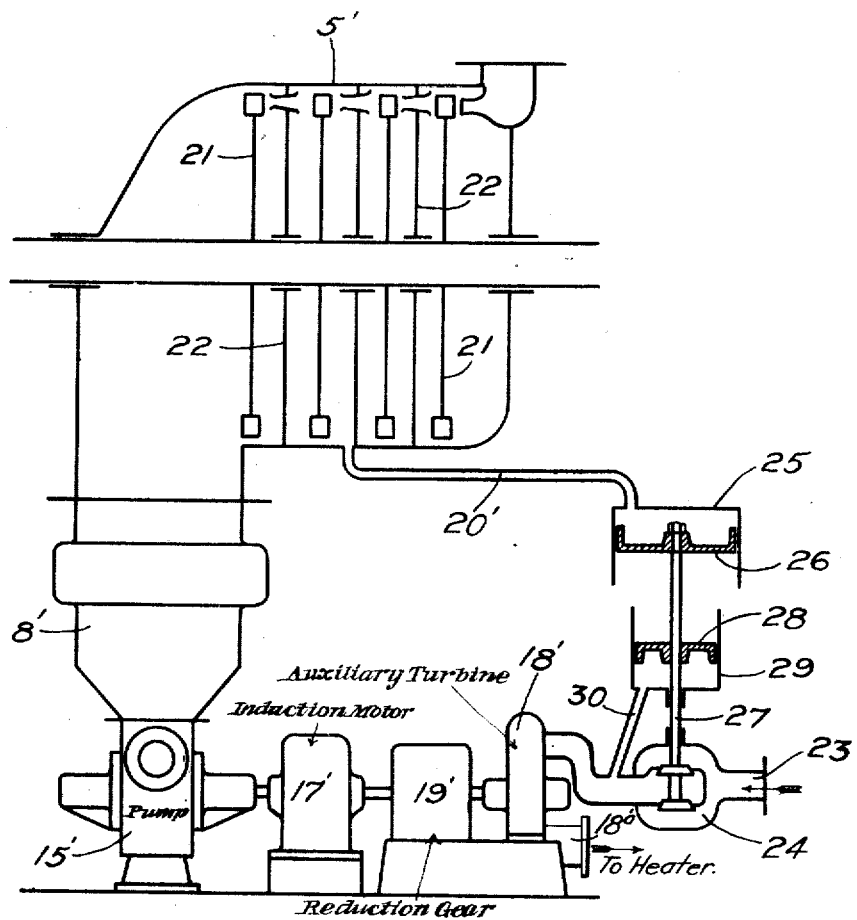

Fig. 2 is a diagrammatic part sectional view of a second system embodying my invention.

Condensers are usually the chief auxiliaries employed in connection with large power developing units. They require the greatest proportion of the power consumed by the auxiliaries and are frequently driven by steam operated turbines or motors. In many cases all of the condenser auxiliaries, such as the circulating pump, air pump and the condensing pump are driven by a single motor, engine, or turbine. Without intending to in any way limit my invention, I have illustrated it in connection with condenser auxiliary apparatus.

The apparatus illustrated in Fig. 1 includes a turbine 5 adapted to receive steam through an inlet port 6 and to discharge it through an exhaust port 7 into a condenser 8. As shown, the turbine 5 is provided with a speed responsive governor 9 which controls the delivery of steam to the turbine by means of a valve 10 located between the inlet port 6 and the working passages 11 of the turbine.

The condenser 8 illustrated is of the jet type, having a vertical cylindrical shell 12 communicating directly at the top with the exhaust port 7 of the turbine 5 and terminating at the bottom in a condensate well 13. The condenser auxiliaries such as the condensate pump 14 and the air pump 15 are located in the condensate well 13 or adjacent thereto and are axially alined so that a single driving shaft 16 may serve for all.

As shown the auxiliaries are driven by means of an electric motor 17 coupled directly to the shaft 16, and also by means of an auxiliary steam turbine 18, which is operatively connected to the motor 17 so that it may carry a part or all of the load depending on the amount of steam delivered to it. The turbine is shown connected to the motor by a reduction gearing 19 which enables both the turbine 18 and the pumps to operate under conditions favorable to high efficiency. The turbine 18 receives steam from the main turbine 5 through a pipe or passage 20 and its exhaust port 18ª communicates with and delivers exhaust steam to the feed water heater.

The motor 17 may receive current from any suitable source and is preferably of the induction type. Where an induction motor is employed as shown steam could be entirely cut off from the turbine 18 and the motor would carry the entire load. If the turbine developed a certain amount of power it would relieve the motor of load, by just that amount; and if the turbine is furnished with sufficient steam to develop the full power required by the auxiliaries (pumps) it would, by having its governor properly adjusted, take the entire load of the motor, and under certain conditions it would not only assume the load of the motor but cause the motor to operate as a generator and deliver current. In fact, if the turbine governor is properly adjusted the turbine may assume any proportion of the load, depending on the amount of steam delivered to it. The governor of the turbine 18 will preferably be in the nature of an automatic stop governor, that is, will be adjusted so that it will only act to prevent the turbine from running away.

The amount of feed water required for the system varies almost directly with variations of load on the main turbine, consequently the amount of steam required for feed heating varies almost directly with the variations in load on the main turbine, or with variations in the steam consumption of the main turbine.

Under heavy loads the steam consumption is high and a large amount of exhaust steam is required for properly heating the feed water. Under light loads the amount of feed water to be heated is small, consequently it is desirable to correspondingly reduce the amount of steam employed for feed heating so that none will be wasted by flowing into the atmosphere.

In order to accomplish this automatically I operate the auxiliary turbine 18 on steam withdrawn from the main turbine and under the control of the governor controlled valve 10. As shown, the steam is withdrawn through the conduit or pipe 20, which connects the auxiliary turbine with the inlet end of the main turbine 5. As the steam supply to the main turbine 5 and to the auxiliary turbine 18 is controlled by the same valve, it is evident that as the steam consumption of the main turbine increases the amount of steam delivered to the auxiliary turbine and thereby rendered available for feed heating purposes is correspondingly increased and vice versa. Meanwhile the motor 17 carries a greater or lesser proportion of the load on the auxiliaries, depending on the amount of steam delivered to the auxiliary turbine 18.

The main turbine 5 may be provided with a bypass or auxiliary inlet 6', for delivering steam to an intermediate stage of the turbine, under heavy or overload conditions. When the bypass is opened and initial pressure steam is delivered to an intermediate stage, the steam consumption of the turbine will be considerably increased, although the steam pressure within the main inlet may not be appreciably increased. With such an arrangement the opening of the bypass will not increase the amount of steam delivered to the auxiliary turbine 18, although the steam consumption of the main turbine will be considerably increased. By connecting the conduit 20 to the working passage of the main turbine at or on the low pressure side of the point of delivery of the by-pass the pressure in the conduit will vary in proportion to the total amount of steam flowing through the turbine and therefore the amount withdrawn and delivered to the auxiliary turbine 18 will always be a substantially definite fraction of the whole.

In some turbines the number of bypasses or auxiliary inlets may be such that it will be necessary to connect the conduit 20 at a point well along toward the exhaust of the turbine in order to get pressure variations truly proportional to the total amount of steam flowing through the turbine. The pressure of the steam withdrawn at such a point might be so low that it could not be economically employed in driving the auxiliary turbine. In Fig. 2, I have illustrated a system in which I have provided means for supplying high pressure steam to the auxiliary turbine in amounts proportional to the flow through a low pressure stage of the main turbine.

As shown, the system includes a main turbine 5', (diagrammatically illustrated as a pure impulse turbine) a condenser 8', condenser auxiliaries 15', a driving motor 17' therefor, and a geared auxiliary turbine 18' for supplementing the motor 17', all arranged as in Fig. 1.

The auxiliary turbine 18' is adapted to be driven by high pressure steam delivered to it by means of a conduit 23. It will, of course, be understood that after doing work in the auxiliary turbine 18', this steam is employed for heating the boiler feed water. In order to proportion the amount of this steam to the amount of steam passing through the main turbine 5', I have provided a valve 24 in the conduit 23, which is responsive in operation to variations in pressure of the steam passing through the main turbine at a point where this pressure is a more or less true measure of the total amount of steam passing through the turbine 5'.

As shown, a conduit 20' communicates with the working passage of the main turbine 5' at a point beyond any bypass or auxiliary inlets, and is adapted to transmit the pressure existing in the main turbine at this point to a cylinder 25 coöperatively located with relation to the valve 24. A piston 26 operates within this cylinder and is shown as mounted on the stem 27 of the valve 24. A similar piston 28 is also mounted on the stem 27 below the piston 26 and operates within a cylinder 29. A conduit 30 connects the cylinder 29 with the conduit 23 on the delivery side of the valve 24.

The operation of the apparatus illustrated is as follows: As the amount of steam traversing the main turbine 5' is increased or decreased, the pressure at the point of connection of the conduit 20' correspondingly increases or decreases, and causes corresponding variations of pressure within the cylinder 25. Pressure on the piston 26 tends to move the valve 24 to the wide open position, but as the valve opens and admits more steam to the auxiliary turbine 18', the fluid pressure acting on the piston 28, in opposition to that on the piston 26, increases, consequently the valve 24 will open or close amounts corresponding to variations in pressure within the working passage of the turbine. The effective areas of the pistons 26 and 28 are proportional to compensate for the difference in pressure of the steam delivered to each. As the ratio between piston diameters is constant, the pressure ratio will be constant and consequently the ratio of the amount of steam passing through the main turbine 5' to that passing through the auxiliary turbine 18' will be constant.

It is evident that the pressure at the inlet of the auxiliary turbine will always be directly proportional to the pressure at a definite point in the working passage of the main turbine, and since the pressure at this point is proportional to the flow of steam through the turbine, it follows that the flow through the auxiliary turbine 18' must be proportional to the flow through the main turbine 5'. With this arrangement only small connections need be made with the main turbine 5', and the auxiliaries may therefore be conveniently located in any part of the power plant.

While I have described and illustrated several embodiments of my invention, it will be apparent to those skilled in the art that various changes, modifications, additions and omissions may be made in the apparatus illustrated without departing from the spirit and scope of my invention as set forth by the appended claims.

What I claim is:

1. In a power developing system, a main power developing unit, an auxiliary power developing unit, a feed water heater adapted to receive exhaust fluid from the auxiliary unit and means for proportioning the delivery of motive fluid to the auxiliary unit in response to variations in the flow of motive fluid through the main unit.

2. In a power developing system, a main steam consuming unit, an auxiliary steam consuming unit, means for heating boiler feed water with the steam exhausted by the auxiliary unit, and means for varying the delivery of steam to the auxiliary unit in response to variations in pressure in the main unit.

3. In a power developing system, a steam driven main power unit, an auxiliary, a steam actuated auxiliary power unit for driving said auxiliary, a feed water heater in which the amount of water to be heated varies with variations in the amount of steam traversing the heater, and which receives steam exhausted from said auxiliary unit, and means for withdrawing from the main unit the steam delivered to the auxiliary unit so that the heating steam supply to the feed water heater varies with the variations in the amount of steam traversing the main unit.

4. In combination in a power developing system, a main power developing unit, auxiliaries therefore, a feed water heater in which the feed water is heated by exhaust steam from the auxiliaries, and means for proportioning the delivery of steam to the auxiliaries to the amount of steam consumed by the main unit so that a heat balance is maintained and substantially all of the available heat in the exhaust steam is given up to the feed water.

5. In a power developing system, a main power developing unit, an auxiliary power developing unit, a feed water heater adapted to receive exhaust fluid from the auxiliary unit, and means for proportioning the delivery of fluid to the auxiliary unit in response to variations in the flow of motive fluid through the main unit.

6. In a power developing system, a main power developing unit, an auxiliary power developing unit, a feed water heater adapted to receive exhaust fluid from the auxiliary unit, and means for proportioning the delivery of heating fluid to the heater in response to variations in the flow of motive fluid through the main unit.

7. In a power developing system, a main fluid operated power developing unit, a feed water heater adapted to receive feed water from the main power unit, an auxiliary fluid operated power developing unit, a fluid supply for the auxiliary unit, means for utilizing the exhaust fluid from the auxiliary unit in heating the feed water, and means for controlling the fluid supply to the auxiliary unit responsive to fluid pressure in the main unit.

8. In a power developing system, a main fluid operated power developing unit, an auxiliary fluid operated power unit, a fluid supply for the auxiliary unit, a feed water heater adapted to receive feed water from the main unit and to be heated by exhaust from the auxiliary unit, and means connecting the auxiliary unit fluid supply with the main unit whereby the said fluid supply is controlled by pressure in the main unit.

9. In a power developing system, in which the steam from the main power unit is condensed, the resulting condensate is delivered to a feed water heater and the heater receives steam exhausted from an auxiliary power developing unit as the heating fluid for the condensate, a main power developing unit, a feed water heater, an auxiliary, an auxiliary power developing unit for driving said auxiliary and exhausting into said heater, means for delivering motive fluid to the auxiliary power unit from a working passage of the main unit, and means for supplementing the power delivered to the auxiliary power developing unit whereby the power transmitted to the auxiliary is independent of the amount of steam traversing the working passage of the auxiliary unit.

In testimony whereof I have hereunto subscribed my name this 19th day of November, 1917.

RAYMOND N. EHRHART.

Witness:
C. W. McGHEE.